United States Patent [19]

deKok et al.

[11] Patent Number: 4,517,954
[45] Date of Patent: May 21, 1985

[54] REMOVABLE MOUNT FOR CUTTING MEANS

[75] Inventors: Peter T. deKok, Fulton County; John Phildius, Gwinnett County, both of Ga.

[73] Assignee: Gran-Quartz Trading, Inc., Decatur, Ga.

[21] Appl. No.: 455,214

[22] Filed: Jan. 3, 1983

[51] Int. Cl.³ .............................................. B28D 1/04
[52] U.S. Cl. ........................................ 125/15; 125/18; 125/22; 407/47; 407/67
[58] Field of Search ....................... 407/47, 48, 67, 46, 407/33, 34; 125/15, 18, 22

[56] References Cited

U.S. PATENT DOCUMENTS

| | | |
|---|---|---|
| 279,780 | 6/1883 | McGaw . |
| 292,809 | 2/1884 | Harris . |
| 2,374,528 | 4/1945 | Emde ..................................... 407/47 |
| 2,589,357 | 3/1952 | Fantozzi ................................ 125/15 |
| 2,736,352 | 2/1956 | Wright ................................. 143/135 |
| 2,805,468 | 10/1957 | Williams ............................... 407/47 |
| 2,852,048 | 9/1958 | Cox . |
| 3,274,862 | 9/1966 | Babich .................................. 407/47 |
| 3,291,583 | 12/1966 | Lindblad ............................... 51/293 |

FOREIGN PATENT DOCUMENTS

| | | | |
|---|---|---|---|
| 2314977 | 10/1974 | Fed. Rep. of Germany | 125/15 |
| 2730912 | 1/1979 | Fed. Rep. of Germany | 125/15 |
| 1206736 | 9/1970 | United Kingdom | 125/18 |

*Primary Examiner*—Harold D. Whitehead
*Attorney, Agent, or Firm*—James B. Middleton

[57] ABSTRACT

A cutting element, for use on the cutting member of a variety of cutting machines, particularly for stone cutting machines. The cutting element includes a base member substantially permanently fixable to the cutting member, and a cap member selectively engageable with the base member. The cap member has hooks that mechanically lock the cap member to the base member, so removal of the cap member during cutting motion is resisted mechanically. The cap member can be moved laterally of the base member for removal; and, a locking pin or screw selectively holds the cap member against such lateral motion.

2 Claims, 10 Drawing Figures

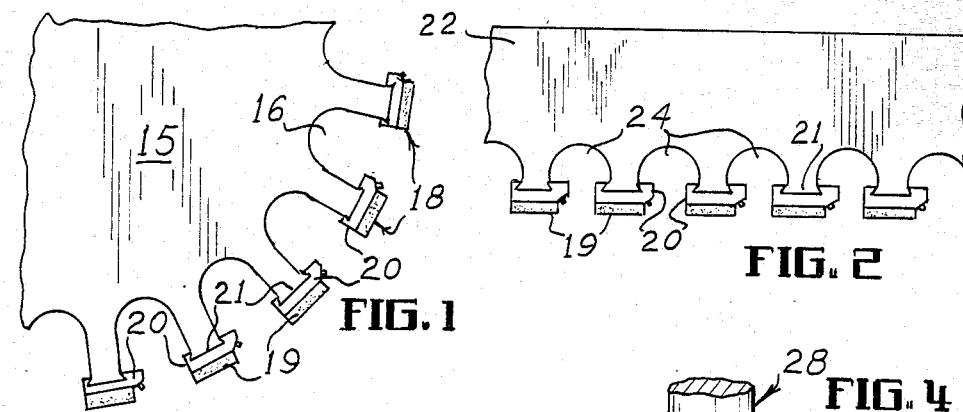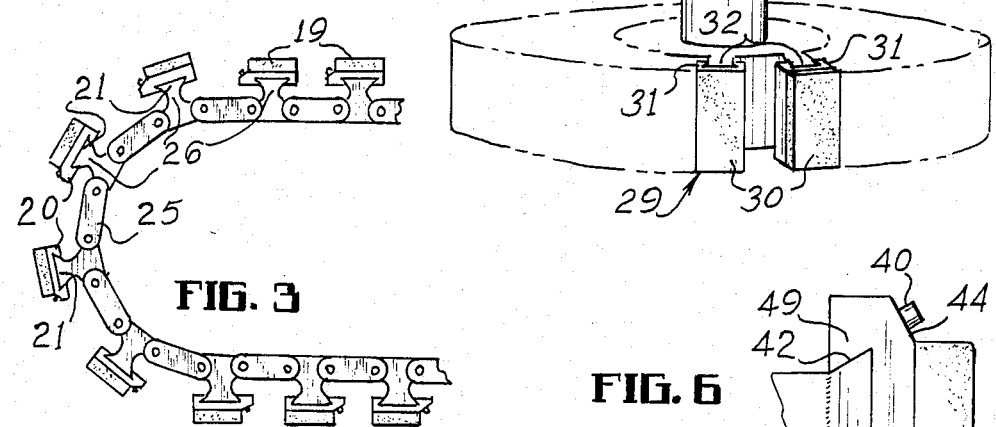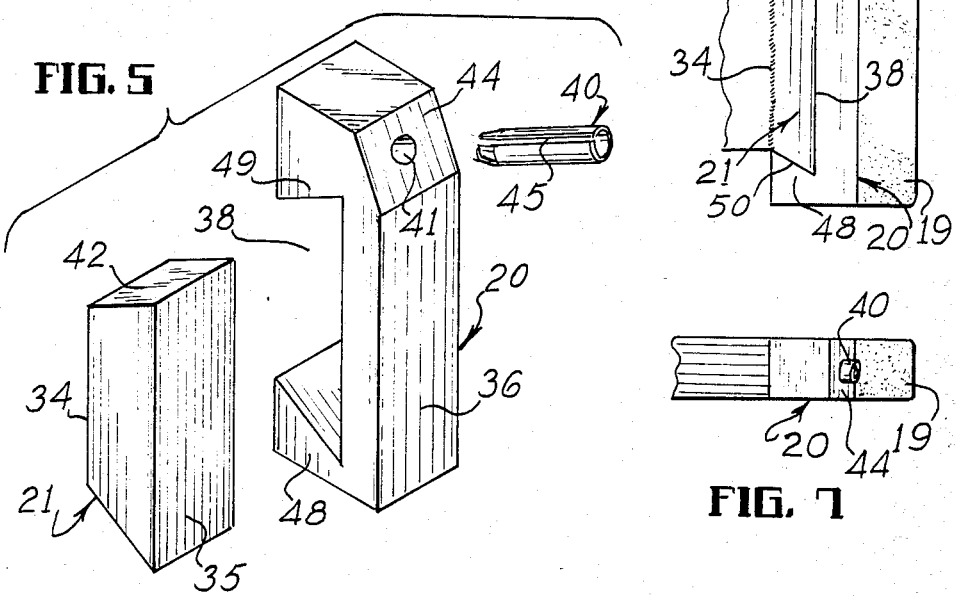

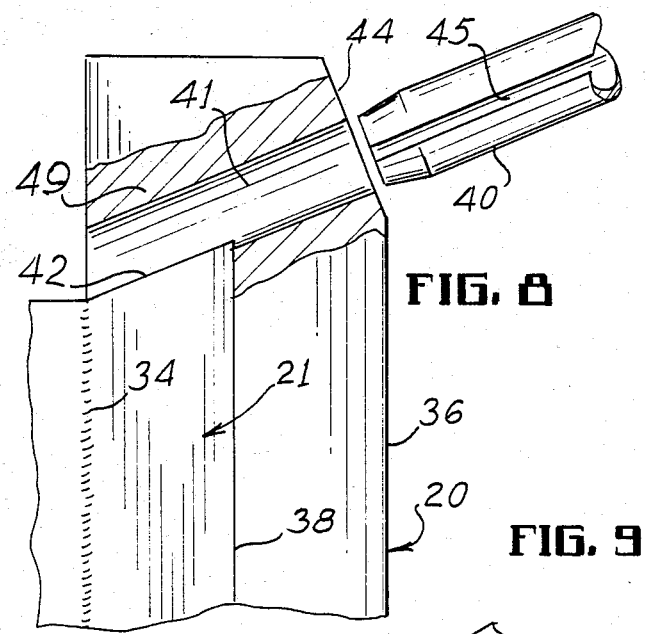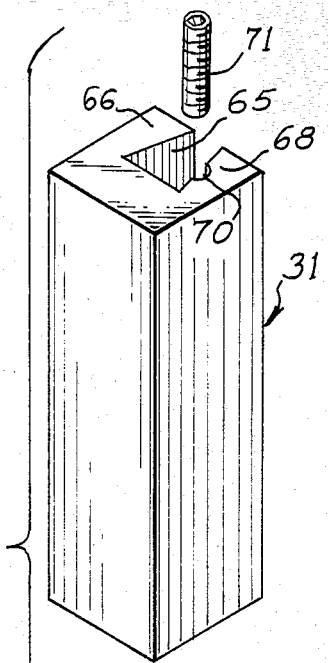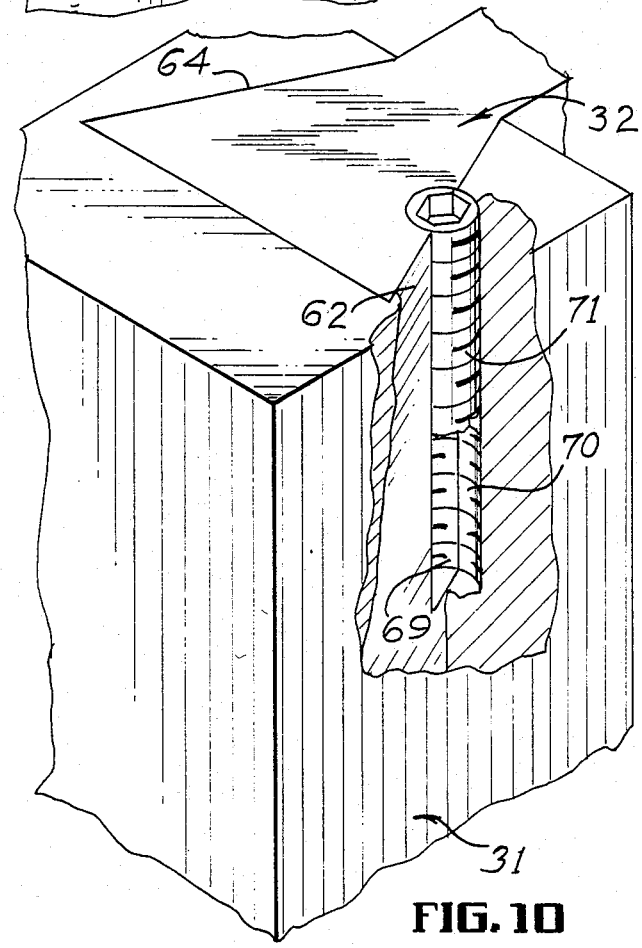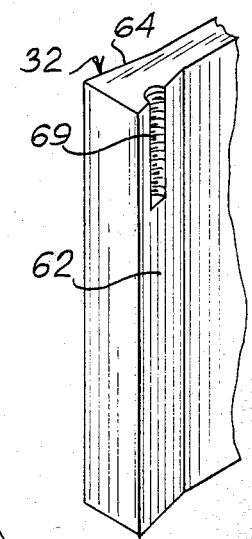
FIG. 8
FIG. 9
FIG. 10

4,517,954

REMOVABLE MOUNT FOR CUTTING MEANS

FIELD OF THE INVENTION

This invention relates generally to cutting teeth and the like, and is more specifically concerned with a mounting means to render cutting means removable from and replaceable on the cutting members, particularly for stone cutting tools.

BACKGROUND OF THE INVENTION

There are several forms of cutting tools wherein a plurality of teeth, or cutting elements, move along a surface to make a cut. These teeth or cutting elements, are mounted on different types of cutting machines including rotary saws, gang, or reciprocating saws, and chain saws. The rotary saws have large blades, ranging up to 3500 mm in diameter with a thickness in the vicinity of 9 mm. The reciprocating saws have blades up to 8000 mm long with a thickness around 10 mm. In all the above mentioned cutting machines, the stone cutting is accomplished by the teeth or cutting elements arranged along the cutting edge of the blade. The cutting elements are formed of metal-bonded diamond particles, so that the diamond particles do the actual cutting of the stone. Thus, as the diamond particles are worn away, the cutting elements must be replaced with new cutting elements.

The conventional technique for replacing the cutting elements is to remove the remains of the old cutting elements, and weld or otherwise bond new cutting elements to the blade. These techniques require heat, which may warp or unbalance the saw blade requiring extensive reworking of the blade. Additionally, the entire cutting blade must frequently be shipped long distances because the diamond industry and the stone cutting industry are vastly removed from each other geographically.

Because of the above discussed difficulties, there have been some efforts at providing easily removable and replaceable cutting elements for stone cutting saws and the like. These efforts have been largely unsuccessful both because of the difficulty in providing a suitable mechanical structure, and because of the limitation in the cutting tools caused by the particular form of removable cutting elements. The prior art removable cutting elements have normally required a rather complex mechanical arrangement, and have usually required considerable thickness in the saw to achieve the necessary strength in the mounting structure. Furthermore, the prior art removable cutting elements have been adapted for use on only one type of cutting machine, and cannot be used on other types.

SUMMARY OF THE INVENTION

The present invention overcomes the above mentioned and other difficulties with the prior art by providing an extremely simple mounting means including a base member attachable to the cutting member of the saw or other cutting machine. The base member can be permanently secured, as by welding or the like, and can be made the same thickness as the conventional cutting blade, or as wide as may be desired for other forms of cutting members. The base member cooperates with a removable cap member, the cap member having a cutting means fixed thereto, for example a diamond segment. The cap member is installed on the base member by a motion angularly related to the direction of cutting motion of the cutting member so that, after the cap member with its cutting means is fixed to the base member, normal cutting motion will be resisted by mechanically interlocked pieces rather than by temporary securing means. The cap member can be removably fixed to the base member by generally conventional means, the securing means being well within the kerf, or otherwise located not to interfere with normal cutting operations. Additionally, the parts are simple shapes that are easy to machine to close tolerances using conventional machine tools.

BRIEF DESCRIPTION OF THE DRAWINGS

These and other features and advantages of the present invention will become apparent from consideration of the following specification when taken in conjunction with the accompanying drawings in which:

FIG. 1 is a partial side elevational view of a circular saw having removable cutting segments that are made in accordance with the present invention;

FIG. 2 is a view similar to FIG. 1 showing a reciprocating saw;

FIG. 3 is a view similar to FIG. 1 showing a chain saw;

FIG. 4 is a perspective view showing a milling cutter having cutting segments thereon formed in accordance with the present invention;

FIG. 5 is an exploded perspective view showing the base and cap members for use on a saw such as that pictured in FIGS. 1, 2 or 3;

FIG. 6 is a side elevational view of the device shown in FIG. 5 of the drawings, the device in FIG. 6 being assembled and having the cutting segment thereon;

FIG. 7 is a top plan view of the device shown in FIG. 6;

FIG. 8 is an enlarged fragmentary view showing the means for securing the cap member to the base member;

FIG. 9 is an exploded perspective view of a device made in accordance with the present invention for use on a cutter such as that shown in FIG. 4; and, FIG. 10 is an enlarged perspective view showing the means for securing the cap member to the base member in a device such as that shown in FIG. 9.

DESCRIPTION OF THE EMBODIMENTS OF THE INVENTION

Referring now more particularly to the drawings, and to those embodiments of the invention here presented by way of illustrations, FIG. 1 shows a circular saw blade 15 having notches 16 between cutting members generally designated at 18. These cutting members 18 include the cutting segments 19 fixed to the cap members 20, the cap members 20 being removably fixed to the base members 21. The base members 21 are welded or otherwise permanently fixed to the periphery of the circular saw blade 15. It will therefore be understood that, when the cutting segment 19 is worn out, the cap member 20 with the attached segment 19 can be removed, and a new cap member 20 with a new cutting segment 19 can be installed. This can usually be accomplished without dismounting the circular saw blade 15.

Looking at FIG. 2, there is a reciprocating, or gang, saw blade designated at 22, the saw blade 22 having notches 24 along the cutting edge thereof, and base members 21 fixed to the cutting edge of the saw blade 22. As in the device shown in FIG. 1 of the drawings, the base member 21 receives a cap member 20 which has a cutting segment 19 fixed thereto.

FIG. 3 of the drawings shows a chain saw having a chain 25 of generally conventional construction, certain links of the chain 25 having outwardly extending mounting members 26. The mounting members 26 have fixed thereto the base member 21 which receives the cap member 20 as previously discussed. Also, the cap member 20 has a cutting segment 19.

FIG. 4 of the drawings shows a milling cutter having a plurality of cutting elements 29. The cutting elements 29 comprise cutting segments 30 mounted on cap members 31 which are removably receivable on base members 32. As will be discussed in more detail hereinafter, the construction of the cap member and base member 31 and 32 is substantially the same as the construction of the cap member and base member 20 and 21, but the proportions are different to accommodate a milling cutter as opposed to a saw blade or the like.

It will thus be understood that the present invention provides a virtually universal cutting element, the cutting element being very readily adaptable to cutting machines regardless of the type of machine. In all cases, it will be realized that the cutting element of the present invention will be mounted and dismounted with motion in a direction angularly related to the cutting direction of the cutting element.

Attention is now directed to FIG. 5 of the drawings for a detailed description of the construction of a device made in accordance with the present invention. It will be seen in FIG. 5 that the base member 21 has a width generally equal to the width of the cap member 20. The base member 21 is formed as a dovetail, and is arranged so that the cap member 20 can be mounted thereon by lateral motion. The base member 20 has a rear surface 34 that would be fixed to the saw blade 15 or 22 or the like, and an outer surface 35, the outer surface 35 being longer than the inner surface 34 so the upper and lower surfaces diverge to form the dovetail shape. Also, the cap member 20 includes an outer surface 36 to which the cutting segment 19 would be fixed, and a base receiving opening 38. The base receiving opening 38 is substantially the same size and shape as the base member 21 so that the base member 21 will fit within the opening 38 and the cap member 20 will be mechanically locked against all motions other than the lateral motion used for installation.

Looking also at FIG. 6 of the drawings, it should be understood that with this arrangement, the cutting segment 19 would be moved up or down as viewed in the drawings, and both of these motions would be resisted by the dovetail interlock between the base 21 and the cap 20. To hold the cap 20 on the base 21 against lateral forces, there is here shown a pin 40 received within a hole 41 in the cap member 20.

In more detail, and considering also FIG. 8 of the drawings, it will be seen that the uppermost edge 42 of the base member 21 is angled upwardly, and the upper wall of the opening 34 is angled in the same fashion. Generally parallel to this line, the hole 41 is provided, the hole 41 being drilled or the like through the cap member 20. For convenience, the cap member 20 is provided with an angled surface 44 generally perpendicular to the centerline of the hole 41. As is best shown in FIG. 8 of the drawings, the hole 41 passes through the solid material of the cap member 20, but slightly overlaps the opening 38. The result is that, when the cap member 20 is placed over the base member 21, the upper surface 42 of the base member 21 is received somewhat within the hole 41.

The pin 40 is here shown as a roll pin having a longitudinal opening 45. Because of the opening 45, the roll pin 40 can contract somewhat in diameter. Thus, the arrangement is that the roll pin 40 is so sized as to be driven into the hole 41. When the roll pin 40 reaches the base member 21, the roll pin 40 will be further diminished in diameter to wedge the cap member 20 very tightly to the base member 21.

It will be understood that, considering the arrangement shown in FIG. 1 of the drawings, it would be virtually impossible to drive the pin 40 from the hole 41. As a result, it is contemplated that the pin 40 will be slightly longer than the hole 41 so the pin 40 protrudes from the surface 44 when the pin 40 is fully installed. The protruding pin 40 is out of the way of the cutting segment 19 and there will be no interference with the cutting action. However, when the cutting segment 19 is worn out, one may grasp the protruding end of the pin 40 to remove the pin from the hole 41. Once the pin 40 is removed, the cap member 20 can be moved laterally to remove the cap member from the base member 21.

Due to the above described construction, it will be understood that the tolerances between the base member 21 and the opening 38 in the cap member 20 can be quite close. It will be easily understood that the cap member 20 cannot move with respect to the base member 21 longitudinally because the cap member 20 is provided with, effectively, hook members 48 and 49 that hook over the ends 42 and 50 of the base member 21. The cap member 20 will not move laterally with respect to the base member 21 because of the above described pin 40. The wedging action will be sufficient to hold the cap 20 against any normal forces that may be applied to the cap member 20. If the cap member 20 has rotational forces applied thereto, the axis of rotation being at one side of the base member 21, it will be seen that the hook members 48 and 49 will again tend to hold onto the surfaces 42 and 50 of the base member 21. If the rotational force is applied with the axis radially of the saw blade 15, it is only the width of the base 21 and cap member 20 and the closeness of tolerances that will prevent such motion. Those skilled in the art will understand that, with the relatively hard metals involved, and reasonably close tolerances, the width of the base member 20 and cap member 21 can be as small as a few millimeters, and there will still be sufficient mechanical resistance to such a rotational force. Of course, the wedging action of the pin 40 will further tend to prevent such motion.

The upper and lower surfaces 42 and 50 of the base member are here shown as diverging to form the dovetail as described. Those skilled in the art will realize that the object to be accomplished is to provide the mechanical lock as described, and other arrangements may be used. It will be obvious that the shapes of the base member and cap member can be exchanged; however, in the environment set forth, the pin 40 would be more difficult to insert and remove. Other forms of temporary securing means may obviate this difficulty.

Looking now at the embodiment of the invention shown in FIGS. 9 and 10, there is a base member designated at 32 and a cap member designated at 31. As in the previously described embodiment, the base member 32 has a dovetail configuration including sloped diverging surfaces 62 and 64. The primary difference between the base member 32 and the base member 21 is that the base member 32 is relatively short in the cutting direction (between the surfaces 62 and 64) and is elongated in the opposite direction.

The cap member 31 is shaped to engage the base member 32, including an elongated opening 65 to receive the base member 32. The cap member 31 therefore defines hook members 66 and 68, comparable to the hook members 48 and 49.

Referring to FIG. 4 of the drawings, it will be realized that the device shown in FIG. 9 of the drawings is changed in proportion because of the cutting apparatus it is designed to fit. Whereas, in the cutting devices shown in FIGS. 1, 2 and 3 of the drawings, the cut will be a kerf a few millimeters wide, the milling tool shown in FIG. 4 is designed to make a very broad cut, perhaps in the vicinity of two or three centimeters. In both cases, however, the object of the present invention is to have the base and cap members so oriented that the hook members, such as the hooks 66 and 68, mechanically engage the diverging, sloped surfaces, such as the surfaces 62 and 64, of the base member 32. Also, in all cases, the cap member is removed from the base member by motion in a direction generally perpendicular to the direction of cutting motion.

The device shown in FIGS. 9 and 10 utilizes a different form of means to hold the cap member 31 to the base member 32. It will of course be understood by those skilled in the art that, depending on the particular design of the milling cutter, the arrangement as disclosed in conjunction with FIGS. 5–8 may be used; however, if the individual cutting elements are too closely spaced there may not be room for the pin arrangement. In this event, the holding arrangement shown in FIGS. 9 and 10 can be utilized.

As is best shown in FIG. 10 of the drawings, the surface 62 of the base member 32 is provided with a semicircular indentation 69, and the hook member 68 is provided with a complementary indentation 70. These indentations 69 and 70 are threaded such that, when the two indentations are aligned as shown in FIG. 10, a single screw 71 can be threaded into the cylindrical opening formed thereby.

While the screw 71 is here shown as a generally conventional set screw, it will be understood by those skilled in the art that a tapered thread or the like may be used to allow the screw to wedge into the space between the cap member 31 and the base member 32. For extremely close tolerances, a straight screw should be adequate; but, if wider tolerances are used, the tapered screw may be desirable.

From the foregoing description, it should now be understood that the present invention provides an extremely simple but highly effective means for providing removable cutting segments on any of a great variety of cutting tools. The device shown in FIGS. 5 through 8 is easily adaptable to virtually any form of saw, and can be made extremely narrow, perhaps down to a width of approximately 3 millimeters or so. Even at this narrow width, it will be seen that the cap member 20 is mechanically locked to the base member 21, and the cutting segment can be moved in either direction without adversely affecting the mount. Also, the cap member 20 will always be precisely placed with respect to the base member 21 so that, once a saw is set up, substitution of new cap members 20 with new cutting segments 19 thereon will not change the configuration of the saw. The device shown in FIGS. 5 through 8 can obviously be made in any greater width desired so that the base member 21 can have a width precisely equal to the thickness of the saw.

For other cutting devices, such as the milling cutter shown in FIG. 4, the proportion of the mounting device can be changed without changing the basic structure or function. Thus, the device can be made wider but shorter as shown in FIG. 9, and it will be seen that the device can still be operated in either direction, and that both directions are still substantially perpendicular to the motion required for removing the cap member 31 from the base member 32.

While two forms of holding means have been herein disclosed for securing the cap member to the base member in a removable fashion, those skilled in the art will readily devise additional temporary securing means. From the examples given herein, it will be understood that various forms of pins, set screws and the like can be used, the object being to place the securing means in a relatively convenient location without allowing the securing means to interfere with the cutting action. Also, it will be realized that the device of the present invention can be dimensioned and proportioned as may be needed to adapt the device to other forms of cutting machines, all without changing the inventive concept.

It will therefore be understood by those skilled in the art that the particular embodiments of the invention here presented are by way of illustration only, and are meant to be in no way restrictive; therefore, numerous changes and modifications may be made, and the full use of equivalents resorted to, without departing from the spirit or scope of the invention as defined in the appended claims.

We claim:

1. Mounting means for removably mounting cutting elements on a cutting machine, said cutting machine having a cutting edge movable in at least one direction for cutting material, said cutting edge being movable into a kerf in the material being cut, and a plurality of cutting elements distributed along said cutting edge for performing the cutting, each cutting element of said plurality of cutting elements comprising a base member fixed to said cutting edge, a cap member selectively fixable to and removable from said base member, and a cutting segment fixed to said cap member, characterized in that said base member has a width generally equal to the width of said kerf, and said cap member has a width generally equal to the width of said kerf, said base member has a rear surface fixed to said cutting edge of said cutting machine, and a front surface longer than said rear surface so that end surfaces of said base member diverge and cause said base member to have a dovetail shape, said cap member defines an opening therethrough for receiving said base member, said opening being substantially the same size and shape as said dovetail shape, the arrangement being such that said cap member is receivable on said base member by motion transverse to said at least one direction, and further including securing means for selectively securing said cap member to said base member, said cap member defining hook members at each end of said opening, said hook members engaging said end surfaces of said base member, said hook members mechanically locking said cap member to said base member against motion of said cutting edge of said cutting machine, and securing means including a pin received between one of said hook members and the adjacent end surface for preventing transverse motion of said cap member with respect to said base member.

2. Mounting means as claimed in claim 1, said cap member defining a hole therein extending through one of said hook members, said hole extending parallel to the surface of said one of said hook members and being sized to receive said pin, said hole being so located that said pin received within said hole wedges against an end of said base member.

* * * * *